Dec. 9, 1969  G. STRADELLA  3,482,289
BAND SEPARABLE FASTENER
Filed Oct. 9, 1967
FIG. 1
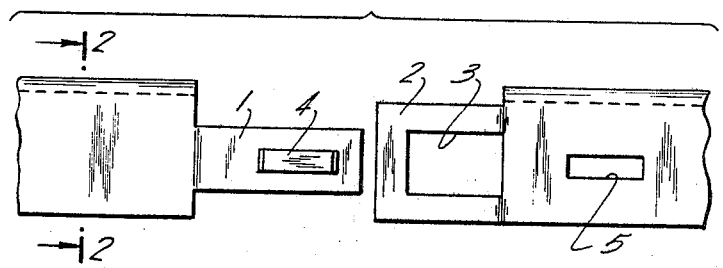
FIG. 3
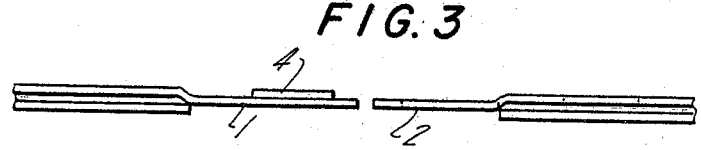
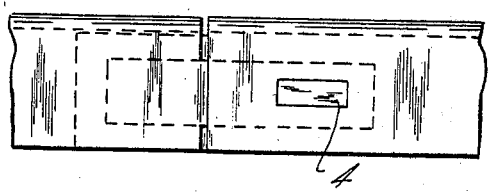
FIG. 4
FIG. 2
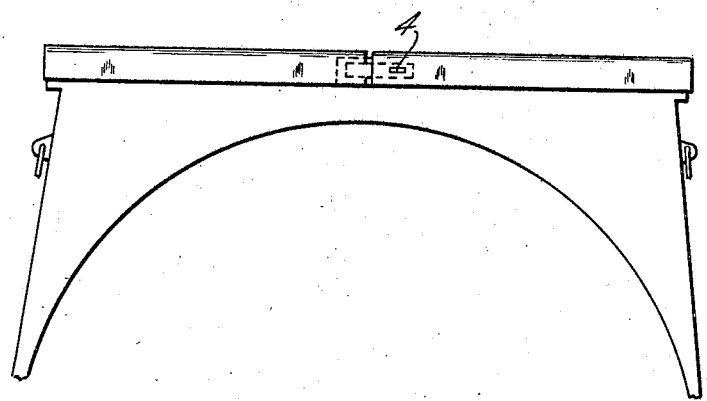
FIG. 5
INVENTOR.
GIUSEPPE STRADELLA
BY
SPARROW AND SPARROW
ATTORNEYS

United States Patent Office 3,482,289
Patented Dec. 9, 1969

3,482,289
BAND SEPARABLE FASTENER
Giuseppe Stradella, Via Roma 13,
Recco, Genoa, Italy
Filed Oct. 9, 1967, Ser. No. 673,776
Int. Cl. F16b 7/04; B65d 63/08
U.S. Cl. 24—201   2 Claims

ABSTRACT OF THE DISCLOSURE

Closure system for locking-rings and the like, in general, wherein the two ends to be joined are of the tongue-and-slot, quick-engageable type with double snap-fitting action, and the interengaging portions are offset with respect to the plane of the ring and are provided with at least one detent tongue or dog and, respectively, with at least one inter-engagement slot, so as to afford a two-position junction, the first position ensuring a loose lock as a preliminary to assembling and the second position ensuring a positive final lock.

---

This invention relates generally to a closure system for locking-ring and the like, substantially ensuring a preliminary pre-engagement of the two ends to be joined at a position close to the final locking position, thus ensuring advantageously a more rapid assembling work in the field of industrial mass production.

The invention has been devised to facilitate the assembling of locking-rings and the like for clamping rigid members within resilient or yieldable frames, for example a sight-glass for sub-water masks within a rubber or plastic body that forms the component that mates with the user's face. Experience has shown that—in industrial mass production—the assembling of a locking-ring on said body after having mounted the sight-glass therein, due to the required tension, involves tiresome- and time-consuming tractive efforts to join the two ends of the locking-ring. I have found that this problem can be solved by means of a pre-engagement system, that is a system adapted to be previously held in a nearly-locked position, thus enabling a pre-engagement of the ring in a first stage of the work, and thereafter a complete locking in a successive stage.

I have considered as unacceptable any clamping-screw system inasmuch as particularly on sub-water masks it inevitably presents undesirable projections, and I have attempted to solve the problem by means of a flat interengagement dog-clutch as described in my U.S. Patent No. 3,141,208. This known system, though of the quick-coupling type, requires that the approaching and the final engagement of the ends be effected "in situ," that is directly on the body to be clamped, and in a single operation.

I have then devised a joint that is adapted to be frictionally pre-engaged and thereafter locked with two different operating steps, thus facilitating considerably the mass production of sub-water masks and other articles presenting similar requirements of pressure-clamping.

Substantially, the invention provides on the two end-portions to be joined a tongue-and-slot, double snap quick-engagement system having interengaging portions that are offset with respect to the plane of the ring and provided with at least one detent dog and one interengaging slot, respectively; the whole system being thoroughly flat and without any projection on completion of interengagement, and being easily disengageable as required.

A preferred embodiment of this invention is shown, as a nonlimitating example, particularly in the field of sub-water masks, in the accompanying drawings, wherein:

FIG. 1 is a plan view of the opposed end portions to be joined in a clamping-ring or closure-ring;

FIG. 2 is a transverse section of the ring on line A—A of FIG. 1;

FIG. 3 is a side view of the end portions of FIG. 1;

FIG. 4 is a plan view of the end portions in their final locking position;

FIG. 5 is a plan view, as an exemplifying embodiment, of a sub-water mask provided with a locking-ring according to the invention, suitably mounted and clamped thereon.

As clearly shown on the several views, the end portions of the locking-ring of the shown embodiment are of the tongue-and-slot type. The first portion 1 is in the form of a flat tongue, and at the junction with the wider body portion of the ring has a S-shaped configuration so as to be in an offset plane to the upper plane of the ring, to the extent of the thickness of the ring, as can be clearly seen in FIG. 3. The slotted end portion 2 has a frame-like configuration and comprises a slot 3 having the same width as the tongue 1, that consequently is engageable therein. End portion 2 is also in an offset plane to the upper plane of the body portion of the ring.

Tongue 1, at a given distance from its junction base, is provided with at least detent dog 4, of rectangular shape or other similarly effective shape, projecting to the extent of the thickness of the flat body of the ring, and preferably formed by slitting and embossing the same. On the opposed end portion of the ring, at a position spaced rearwardly exactly the same distance from the union of tongue 1 and the inner side of detent dog 4, is formed a rectangular slot 5 adapted to receive said detent dog 4.

The interengagement of the two ends of the ring is effected, as desired, in two steps, that is a frictional pre-engagement step after which the ring—even if released—keeps closed but not clamped, and a clamping step after which the ring will be substantially uninterruptedly closed as shown on FIG. 4. To carry out the first step it is just necessary to insert tongue 1 into slot 3 with a diagonal downward movement and insertion to at least half of its length. When so assembled, the ring can be released and then mounted on the article to be clamped. To achieve the final lock it is just necessary to grip and press the ring until its ends will abut, at which moment the detent dog will snap automatically into the then registering slot 5 and will be held therein, thus ensuring a suitable closure of the ring.

Of course, the ring can have any suitable configuration, and the detent dog 4 and the slot 5 can also have any suitable configuration.

The invention as shown and described can be modified without departing from the basic principle of the invention, that is to provide an interengagement system for locking-rings and the like, the closure of which can be effected in two successive operative steps, namely, a preliminary pre-engagement step after which the ends of the ring are interconnected and nearly abutting each other, and a clamping step after which the ring is completely closed with abutting and flush ends.

What is claimed is:

1. A lock arrangement comprising, in combination, a tongue member having a flat-shaped base portion and an integral flat-shaped tongue portion joined to said base portion so that the plane of said tongue portion is parallel, offset and spaced from the plane of said base portion; a projecting portion on said tongue portion and projecting from the surface of said tongue portion, said projecting portion lying substantially in the plane of said base portion; a slotted member having a flat-shaped slotted base portion and a flat frame-shaped frontal portion joined to said slotted base portion so that the plane of said frame-shaped frontal portion is offset and spaced from the plane of said slotted base portion, said slotted base portion having a slot shaped to conform to the contour of said projecting portion and said frame-shaped frontal portion having an opening of a size for admitting said tongue portion, said tongue member being insertable through said opening into an engaged position in which the projecting portion lies within said slot and said tongue lies substantially in the plane of said frontal portion.

2. The lock arrangement as defined in claim 1 including flange portions joined to said base portions at their edges.

References Cited

UNITED STATES PATENTS

| | | | |
|---|---|---|---|
| 148,864 | 3/1874 | West | 24—75 |
| 427,355 | 5/1890 | McLaren | 24—20 |
| 1,736,373 | 11/1929 | Seeger | 287—64 X |
| 1,769,895 | 7/1930 | Bersted | 24—224 X |
| 2,113,443 | 4/1938 | Eggerss | 24—20 |
| 2,276,604 | 3/1942 | Wood. | |

BERNARD A. GELAK, Primary Examiner

U.S. Cl. X.R.

287—64; 24—20